United States Patent [19]

Penney et al.

[11] Patent Number: 4,900,146
[45] Date of Patent: Feb. 13, 1990

[54] MULTIPLE CHANNEL OPTICAL FLYING SPOT TRIANGULATION RANGER SYSTEM

[75] Inventors: Carl M. Penney, Schenectady; Nelson R. Corby Jr., Scotia; Nancy H. Irwin, Schenectady, all of N.Y.

[73] Assignee: General Electric Company, Schenectady, N.Y.

[21] Appl. No.: 169,707

[22] Filed: Mar. 18, 1988

[51] Int. Cl.[4] .......................... G01C 3/00; G01B 11/24
[52] U.S. Cl. ......................................... 356/1; 356/376
[58] Field of Search ..................... 356/1, 141, 152, 376

[56] References Cited

U.S. PATENT DOCUMENTS

| | | | |
|---|---|---|---|
| 3,746,454 | 7/1973 | Pace et al. | 356/152 |
| 3,953,131 | 4/1976 | Britz | 356/141 |
| 4,227,812 | 10/1980 | Pirlet | 356/1 |
| 4,583,857 | 4/1986 | Grammerstorff et al. | 356/1 |
| 4,645,917 | 2/1987 | Penney et al. | 250/201 |
| 4,701,031 | 10/1987 | Penney et al. | 350/371 |
| 4,790,660 | 12/1988 | Ito et al. | 356/376 |
| 4,794,262 | 12/1988 | Sato et al. | 356/376 |
| 4,830,485 | 5/1989 | Penney et al. | 356/1 |

Primary Examiner—Stephen C. Buczinski
Attorney, Agent, or Firm—Henry I. Steckler; James C. Davis Jr.; Paul R. Webb II

[57] ABSTRACT

Multiple light detection channels are introduced into a flying spot optical triangulation ranging system to increase the speed of acquiring range values. A laser beam is rapidly swept across a surface by a beam deflector. Each fiber optic channel can receive light only from a different point along a line at the intersection of the swept beam with the surface. The receiver channels are duplicated and separate detectors generate signal pulses at times that are a function of range to the surface. These are processed in parallel to calculate N range values per beam sweep, where N is the number of channels.

11 Claims, 8 Drawing Sheets

MULTIPLE CHANNEL OPTICAL FLYING SPOT TRIANGULATION RANGER SYSTEM

BACKGROUND OF THE INVENTION

This invention relates to a time-based optical triangulation system and especially to improvements to increase the speed of acquiring range valves.

A swept aperture flying spot optical ranging instrument has been developed and was offered as a product known as the MIG TRAK™ welding seam tracker. It is described in U.S. Pat. No. 4,645,917 —Penney, Roy and Thomas and U.S. Pat. No. 4,701,031 —Penney and Thomas. Although it provides the highest quality data among developed ranging systems, the maximum rate at which this type of system can acquire data is limited by the beam deflecting acousto-optic cell to less than 100,000 range elements per second, and in fact runs at about 20,000 range measurements per second. To our knowledge no other developed system runs significantly faster. However, for applications such as a three-dimensional camera a much higher range data rate is needed; for example the present goal for printed circuit board inspection is 4,000,000 range elements per second. What is needed is a faster way to obtain range data while preserving the other high performance features of the MIG TRAK approach.

SUMMARY OF THE INVENTION

The speed of measuring range points in a swept aperture flying spot triangulation ranger is increased by adding additional detector channels, each of which observes the surface at a different sensitive zone along the line which forms the intersection of the swept beam with the surface. Since all of the channels make use of the same swept beam, the beam source and deflector are used more efficiently, providing N range points per beam sweep, where N is the number of channels, rather than only one.

According to one aspect of the invention, the improved flying spot triangulation ranger system is comprised of: means for providing a light beam and rapidly sweeping this beam across a surface in a given direction; multiple light detection channels optically coupled to separate detectors; and receiving lens means for focusing images of the light spot onto the entrance faces of the adjacent detection channels. As the light spot generated by the scanned beam crosses a small sensitive zone on the surface from which a detection channel can receive light, the respective detector generates an electrical signal pulse. These pulses are output at times that are a function of range to the surface; for every sweep of the light beam there are a plurality of range measurements equal to the number of detection channels.

The detection channels are preferably separate non-coherent fiber optic bundles, but may be solid glass, and typically there are ten to twenty such channels. The entrance faces of the detection channels may be rectangular or square, and the sensitive zones "visible" to the channels have corresponding shapes. The detectors may be photomultipliers.

Another aspect of the invention is a multiple channel flying spot triangulation ranger system comprised of a laser beam source and means for deflecting and sweeping the beam across the surface in the X direction; multiple fiber optic light detection channels each receiving light from a different sensitive zone along a scanned line; and a receiving lens. Separate detectors sense the light delivered by the fiber optic channels and generate signal pulses, one per channel, at times respectively related to range to the surface. Means are provided for processing these signal pulses in parallel and calculating multiple range values.

Other features of the system are an aperture stop plate between the receiving lens and light detection channels having a rectangular slit to limit passage of light and increase depth of focus. Mirror means, such as polygons, may be provided to scan the laser beam in the Y direction coordinated with the X direction sweep. The processing means calculates range values after each beam sweep, covering a strip of the surface, before stepping a table to scan adjacent strips.

DETAILED DESCRIPTION OF THE INVENTION

Figure 1:
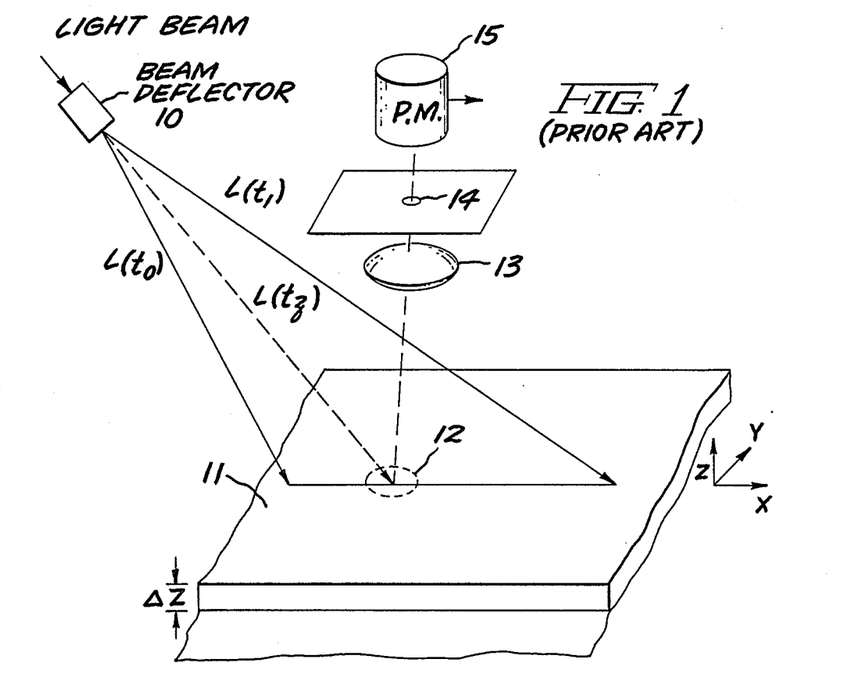
FIG. 1 shows the prior art swept aperture flying spot ranging system.
Figure 2:
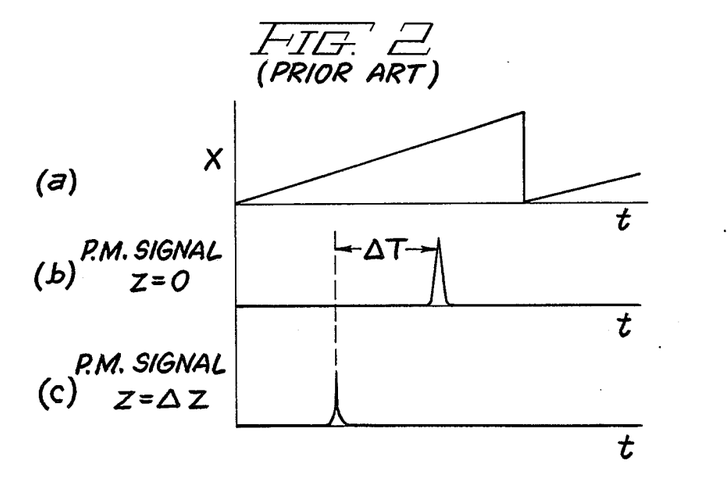
FIG. 2 (prior art) are graphs illustrating the X direction scan and electrical signal pulses generated by the scanned beam at two surface heights.

Referring to prior art FIGS. 1 and 2, a beam of light L is swept by beam deflector 10 along a line across the observed surface 11 over the time $t_0$ to $t_1$. At time $t_z$ within this period, the intersection point of the beam with the surface, a spot of light, passes through the region 12 viewed by the lens 13 and aperture 14; the latter is at the focal point of the receiving lens. Consequently, the scattered light from the point reaches the detector, photomultiplier 15, which puts out a sharp signal pulse at the time $t_z$. An electronic system analyzes this signal to derive a second signal encoding the time of the pulse. Since there is an angle, typically about 30°, between the directions of the swept beam and observed beam, the time at which the pulse is observed is a function of the range to the surface, and in fact varies nearly linearly with this range. Thus this system provides range information in the form of an encoded pulse time. If the surface is lowered by an amount $\Delta Z$, then the position in time of the corresponding detected electrical signal pulse will shift to the left in time as is seen by comparing lines (b) and (c) in FIG. 2. By measuring the time shift ΔT the flying spot triangulation system can measure the change in range.

In practice, the light beam is swept across the surface very rapidly at constant velocity, usually by an acousto-optic modulator beam deflector, such that range measurements can be obtained very rapidly, at rates at least up to 20,000 range measurements per second. Nevertheless, even this high speed is insufficient for some applications, including many that are motivating the development of 3-D cameras.

Figure 3:
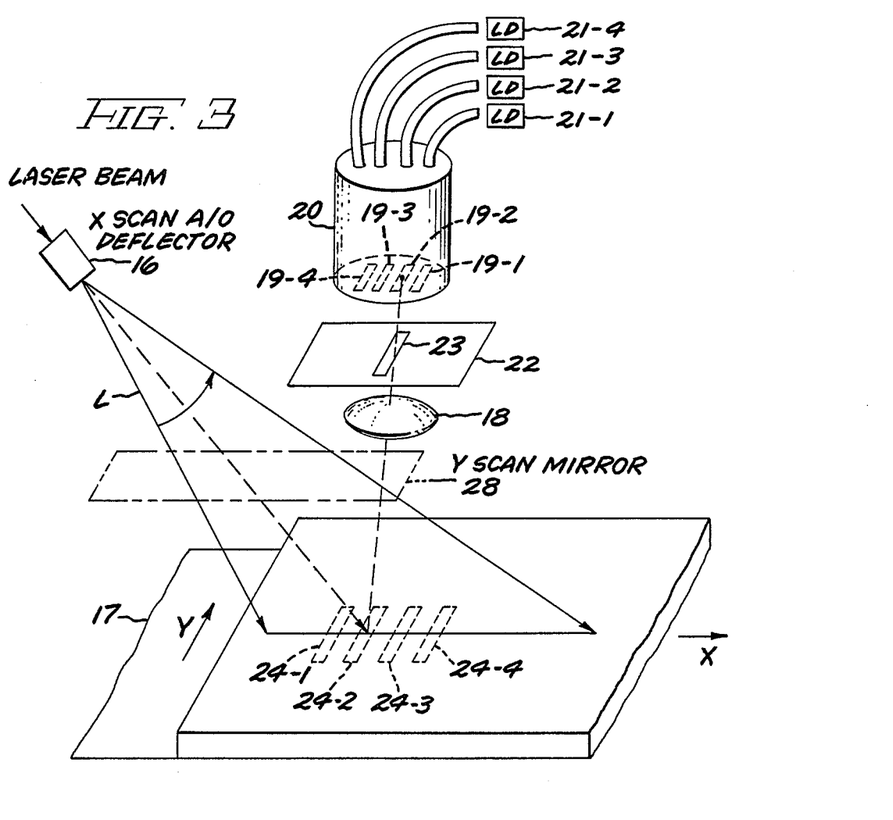
FIG. 3 shows the improved flying spot triangulation ranger having a multiple channel light detector.

FIG. 3 shows the multiple channel optical flying spot triangulation ranger of this invention. A significant increase in speed is achieved by adding additional detector channels, each of which observes the surface at a different point along the line which forms the intersection of the swept beam with the surface. Four light detection channels are illustrated, but ten to twenty channels are feasible and a reasonable upper limit is thirty to forty channels. All of the detection channels make use of the same swept beam L, but there are now N range points per beam sweep, where N is the number of channels. Only the receiver channels must be duplicated to achieve the increased speed.

A laser (not shown) generates a narrow laser beam that is presented to acousto-optic beam deflector 16 and rapidly scanned across the surface 17 in the X direction. A single spherical receiving lens 18 or a compound lens serves all of the light detection channels 19-1 to 19-4, the ends of which are encapsulated in a plastic plug 20. The ends of the light transmitting channels extend out of the plug 20 and deliver light to four separate light detectors 21-1 to 21-4. These may be photomultipliers, certain types of photodiodes, or other solid state light detectors. Photomultipliers are a good choice because they have ideal light detection qualities, i.e. excellent sensitivity and wide dynamic range. Optionally there is an aperture stop plate 22 between the receiving lens 18 and the light detection channels, having a rectangular slit 23 to pass light. This slit is relatively large, say 0.125"×1.000", and functions to increase the depth of focus and limit passage of light, much like the f/stop on a camera. This slit does not serve the same purpose as aperture 14 in the prior art single channel instrument, and is not an essential part of the system. Light detection channel 19-1 receives light only from the sensitive zone 24-1 on surface 17, and the other three channels respectively from the sensitive zones 24-2, 24-3, and 24-4. The shape of these sensitive zones is approximately the same as the entrance faces of the light detection channels and the size of the zones is governed by the magnification of the optical system. A square or rectangular entrance face geometry is ideal; a small aperture is desired in the X direction and the longer Y dimension in the rectangular case gives freedom to align.

Figure 4:
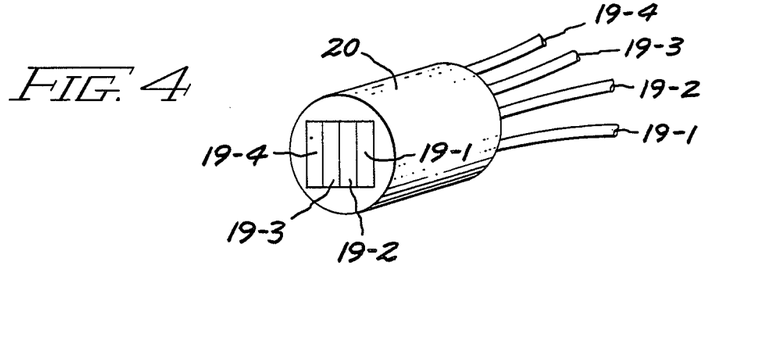
FIG. 4 is a perspective view of the multichannel light detector assembly.
Figure 5:
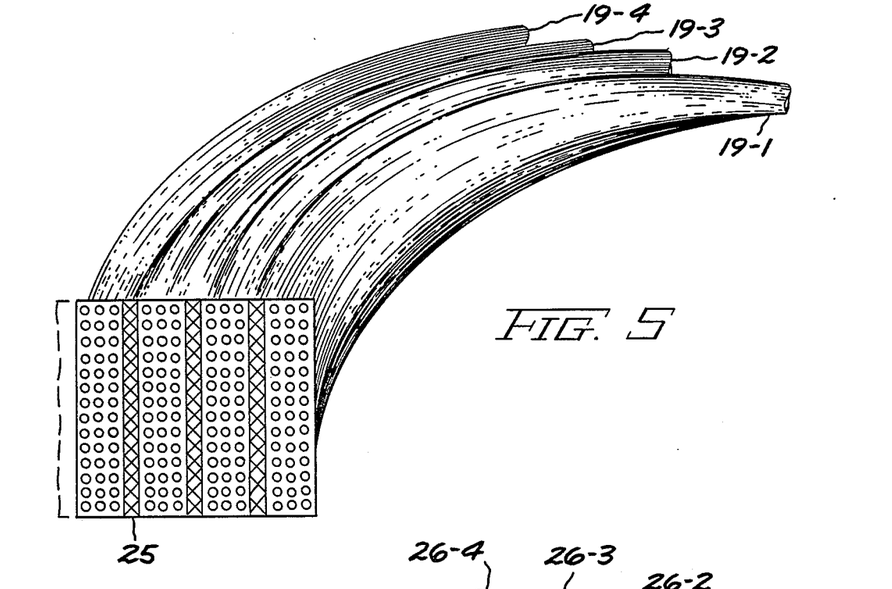
FIGS. 5 and 6 show two embodiments of the light detector respectively having fiber optic and solid glass channels.
Figure 6:
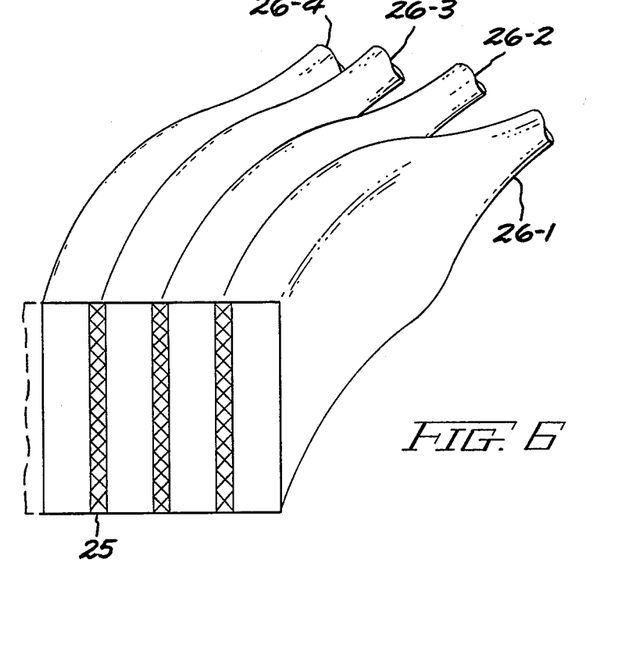

The detector head 20 is illustrated in perspective in FIG. 4. FIG. 5 shows the use of fiber optic bundle technology to create the adjacent fiber optic channels 19-1 to 19-4. Each channel is comprised of a noncoherent fiber optic bundle, rectangular at the entrance and gathered together toward the other end to make a flexible, roughly circular bundle that can be routed to the photomultiplier box. There is an optical separator 25 between the channel bundles, which is an optically opaque barrier to prevent cross channel modulation and to adjust the sensitive area geometry. FIG. 6 shows solid glass light transmitting channels 26-1 to 26-4. In practice, it is reiterated, there are a greater number of light detection channels than are here illustrated, and a flying spot triangulation (FST) ranging system was built having twelve channels. Each channel at the entrance had dimensions of 2 mils by 50 mils, separated by approximately 2 mils of opaque filler. The sensitive zones 24-1 to 24-4 on the surface observed by the channels (FIG. 3) had dimensions of about 1 mil by 5 mils.

Figure 7:
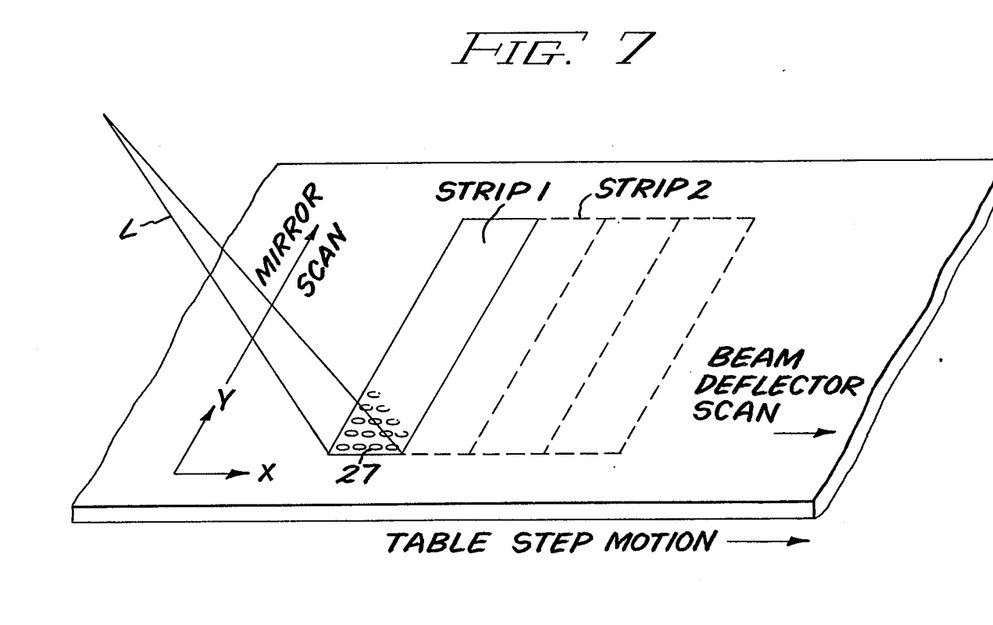
FIG. 7 illustrates the scan motions used in scanning an object.

The scanning of a larger area on an object by coordinated X and Y scans, followed by indexing of a table on which the object rests to scan other strips on the object surface, is illustrated in FIG. 7. The sensitive zones viewed by the multiple light detection channels, which are stationary as is the receiving lens and aperture stop, are shown as circles 27 in this figure. The beam deflector 16 in FIG. 3 sweeps the laser beam L along a line in the X direction as was previously described. As the laser beam L enters and crosses the four sensitive zones 27, the respective light detection channels generate output signal pulses at times that are a function of range to the surface. Thus there are four range points per beam scan. Then a Y scan mirror 28 shown schematically in FIG. 3 scans the beam in the Y direction and a second X scan beam scan is made to obtain four more range measurements. If strip 1 has 500 X beam sweeps and there are 4 range points per sweep, the total from strip 1 is 2000 range points. The table is now stepped in the X direction and strip 2 on the object surface is scanned, and so on.

Figure 8:
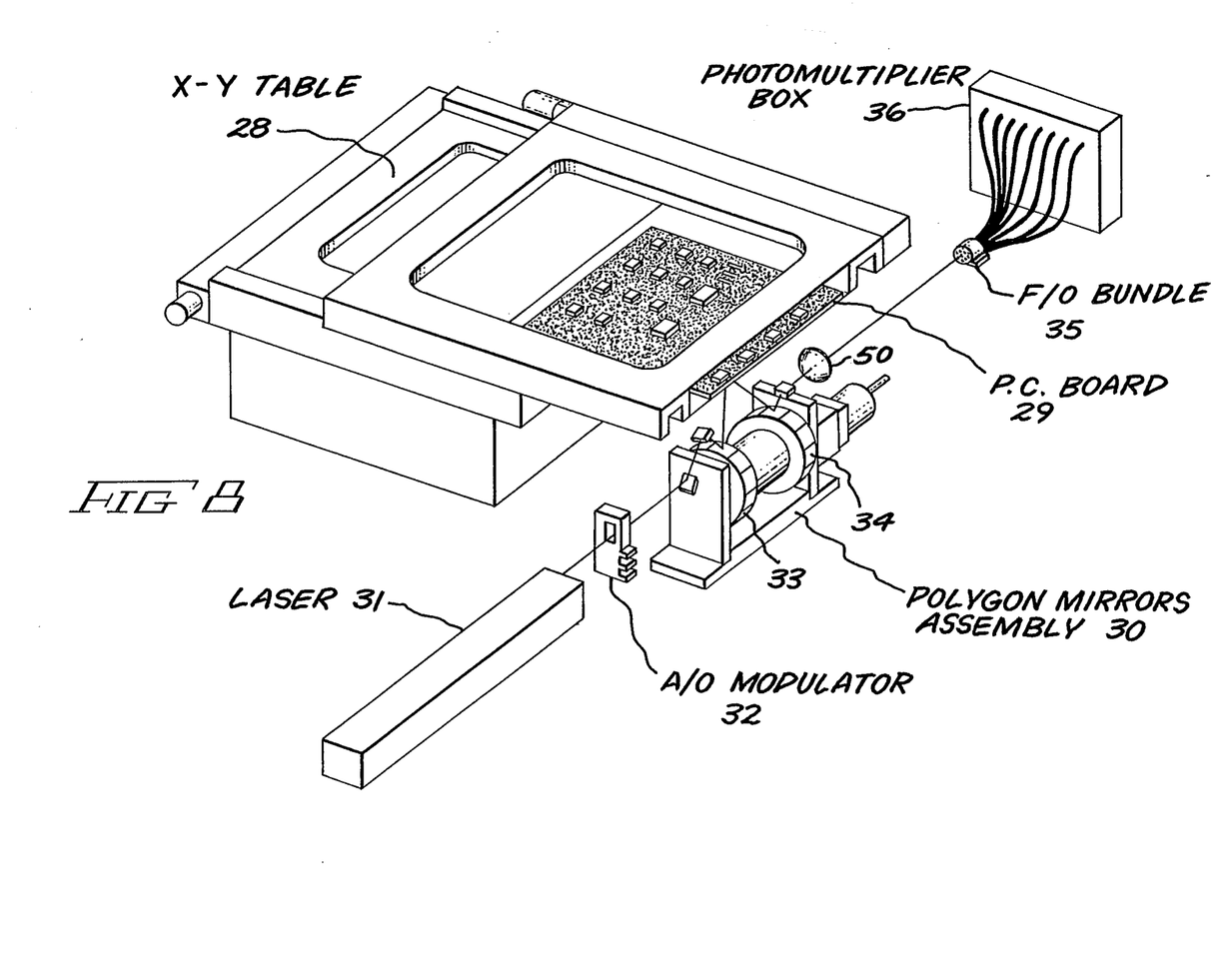
FIG. 8 is a perspective view of an embodiment of the improved range camera to inspect printed circuit boards.

FIG. 8 is a perspective drawing of the entire range camera and X-Y table arrangement to inspect a printed wiring board. These boards consist of a thin planar sheet on which are mounted electronic components such as integrated circuits, resistors and capacitors. These components are interconnected by conductors on the board surface or by sets of conductors within the plane of the board. Within a few years, the complexity will be such that testing of the printed wiring board assemblies can be done only through the use of automated, visually directed inspection machines. The X-Y table 28 holds the printed circuit board 29 with the bottom, lead side facing down towards the optical head and parallel to the X-Y plane. The table scans the active measurement region over the entire surface of the printed circuit board. The polygon mirrors assembly 30 rotates at a constant velocity and operates to Y scan the laser beam and as a Y descanner for the receiving optics. Briefly reviewing, the narrow beam generated by a laser 31 is deflected by the acousto-optic modulator 32 to perform the X scan. The swept beam is reflected by folding mirrors onto the first polygon mirror 33 and hence sweeps across the surface of board 29. The reflected beam is descanned by the second polygon mirror 34, focused by lens 50, and reflected by a mirror to the multichannel fiber optic bundles 35 which deliver light to the photomultiplier box 36.

Figure 9:
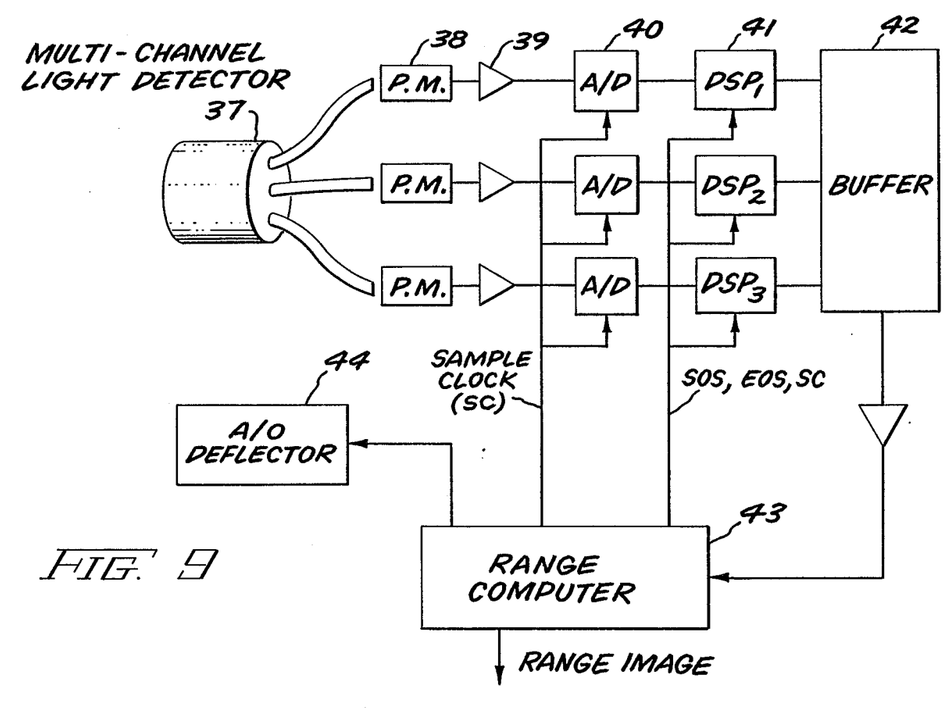
FIG. 9 is a simplified block diagram showing parallel processing of the channel light detector signals to obtain range values.

The signal processing electronics block diagram in FIG. 9 illustrates parallel processing of the detector output signals and computation of range values. Here the multichannel light detector assembly 37 has three channels and, looking at one channel, the others being the same, the signal pulse from photomultiplier 38 is converted to a voltage and conditioned in amplifier 39 and digitized at 40. Digital signal processor 41 produces the best estimate of the time signal after rejecting any possible range clutter and noise impulses, accounts for variations in surface reflectivity and luminance, and calculates range or height of the surface. The three computed range values are presented to buffer 42 and hence read out to the range computer 43. When all the range measurements are stored, a range image may be output. The range computer coordinates the timing of the system and acousto-optic beam deflector 44, and may have other functions such as coordinate conversion.

Figure 10A:
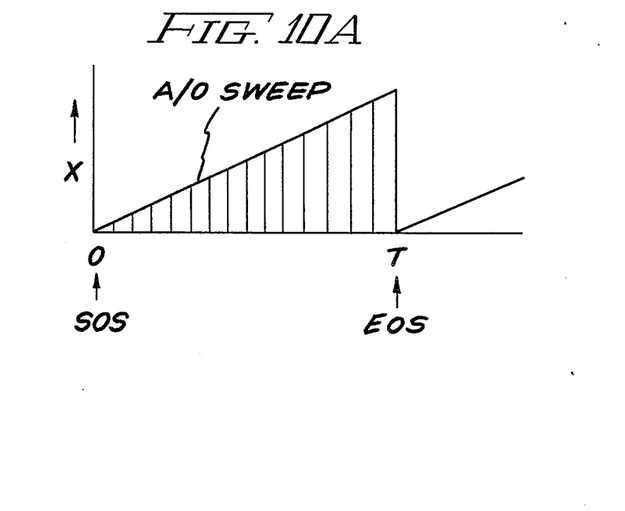
FIGS. 10a and 10b show the X direction acousto-optic deflector scan and the electrical pulses generated by each channel at times dependent on range.
Figure 10B:
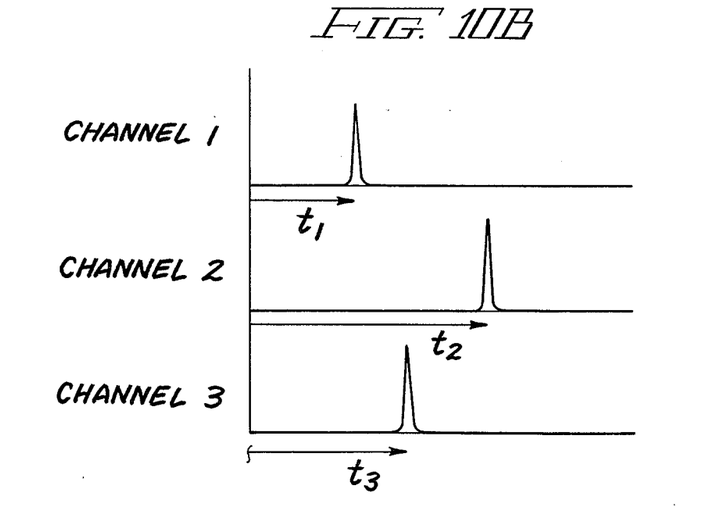

Referring also to FIGS. 10a and 10b, the period T of one acousto-optic sweep is, for instance, 50–60 microseconds and is divided into time segments corresponding to beam angle. The start of sweep (SOS) and end of sweep (EOS) are sent to digital processor 41 as well as the sample clock (SC). In the three channels the detector signal pulse occurs at times $t_1$, $t_2$ and $t_3$, respectively, measured from the start of sweep. These times are a function of range to the surface at those range points. As is explained more fully in U.S. Pat. No. 4,645,917, the disclosure of which is incorporated by reference, this time determines the angle of the swept beam and knowing the angle of the reflected beam, optical triangulation yields the range. For every beam sweep, N range values are determined where N is the number of detection channels.

The use of multiple channels provides a practical increase in data rate by at least a factor of 10. A practical upper limit to the total number of channels may be in the order of 30–40 channels. One consideration is the complexity introduced by a large number of detectors and time analysis electronics. Another limit is the required increase in scan length. This derives from the relationship between scan length and stripe length. The stripe length (in the X direction here) is given by $S = s*N$, where s is the separation between measurement points on the surface. The scan length for a single channel is given by: $L_1 = \Delta Z * \tan\theta$, where $\Delta Z$ is the range over which the instrument is to provide range data. When N channels are used, the scan length must be increased to approximately $$L_N = L_1 + S \qquad (1)$$

where the approximation is good if Z is much greater than $\Delta Z$. This increase insures that all of the channels will be illuminated at some time during the sweep for all surface ranges within $\Delta Z$.

Figure 11:
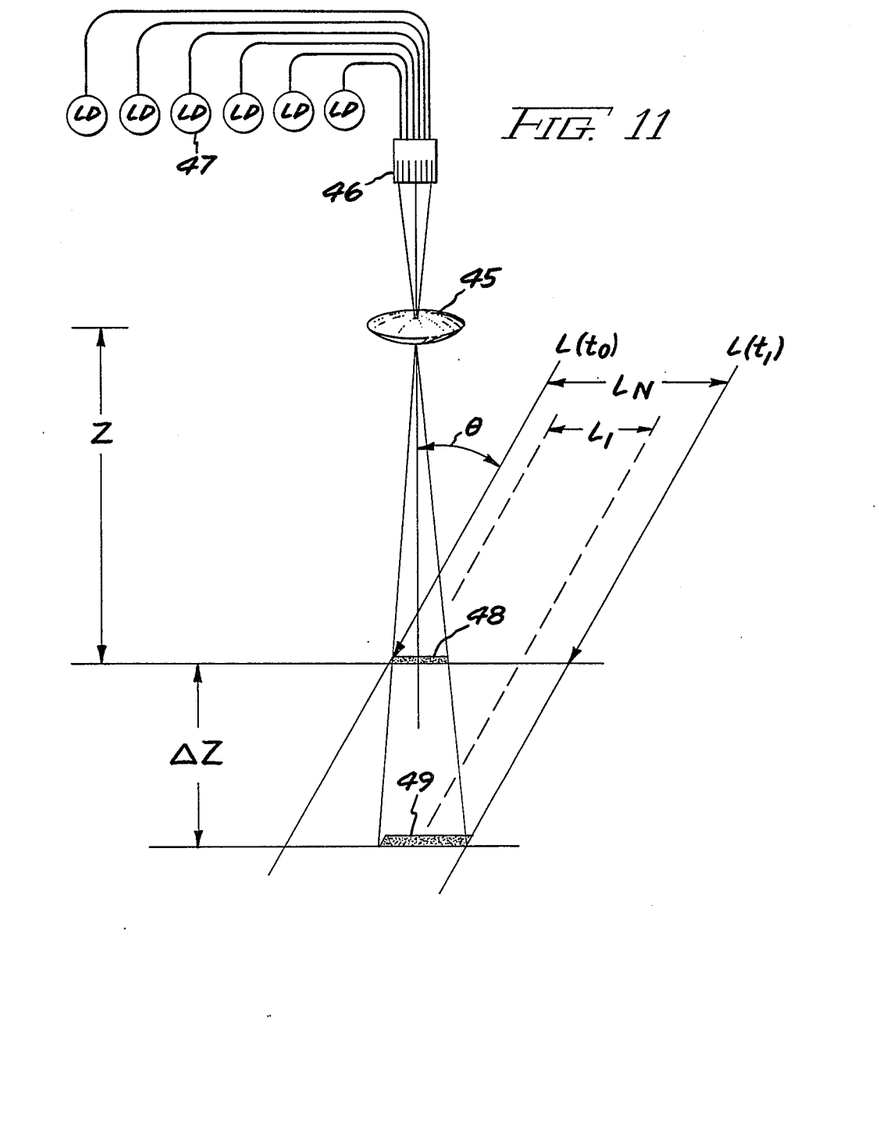
FIG. 11 shows a portion of the multiple channel swept aperture ranger and the required increase in scan length.

This situation is illustrated in FIG. 11, where a portion of the ranger system including focusing lens 45, multiple light detection channel head 46, and fiber optic bundles leading to separate light detectors 47 are shown (N=6). For simplicity the light beam L is shown scanned parallel and swept over the surface from time $t_0$ time to $t_1$. The image of the multiple detection channels on the surface at the closest design range is shown at 48, and the image at farthest design range at 49. For small values of N (typically less than 20) S is much smaller than L, such that an insignificant change in sweep length is required to accommodate the additional channels. But as N is increased, the sweep length must be increased substantially, according to equation (1). This spreads out the light, weakening the signal to each channel. Furthermore, fast scanners such as acousto-optic cells provide a limited number of resolution spots. If the scan is spread out too far, the scanned spot will have an instantaneous width greater than the resolved spot, further weakening the signal. Despite these limitations a very large improvement in data rate is realized within the scanned aperture configuration.

While the invention has been particularly shown and described with reference to several preferred embodiments, it will be understood by those skilled in the art that the foregoing and other changes in form and details may be made without departing from the spirit and scope of the invention as defined in the appended claims.

The invention claimed is:

1. An improved swept aperture flying spot triangulation ranger system comprising:
    means for providing a narrow spot of light beam and rapidly sweeping said beam across a surface in a given direction;
    multiple adjacent linearly arrayed light detection channels optically coupled to separate detectors, one detector per channel, each of said channels having a rectangular entry face, lens means for focusing images of a light spot onto said detection channels entry faces, which respectively receive light scattered from the surface at different rectangular sensitive zones along a line that forms the intersection of said light beam with said surface, and aperture stop means disposed between said lens means and said detection channels having a rectangular slit;
    said detectors each generating a signal pulse at a time that is a function of range to the surface so that for every sweep of said light beam a plurality of range points are measured equal to the number of said detection channels; and
    means for parallel processing said signal pulses and calculating multiple range values.

2. The ranger system of claim 1 wherein said light detection channels are comprised of separate noncoherent fiber optic bundles.

3. The range system of claim 1 wherein said light detection channels are separated by opaque barriers and are solid glass.

4. The ranger system of claim 1 wherein the number of said light detection channels is about ten to twenty.

5. The ranger system of claim 1 wherein said detectors are photomultipliers.

6. The ranger system of claim 1 further comprising mirror means for scanning said light beam in a direction orthogonal to said given direction following every beam sweep and successively measuring other sets of range points, and calculating range values on a strip of said surface.

7. A multiple channel swept aperture flying spot triangulation ranger system comprising:
    a narrow spot of laser beam source and means for deflecting and sweeping said beam across a surface in an X direction;
    multiple adjacent linearly arrayed fiber optic light detection channels, each of said channels having a rectangular entry face and receiving light only from a different rectangular sensitive zone along a line that forms the intersection of said laser beam with said surface, and an aperture stop plate disposed between said receiving lens and said fiber optic channels having a rectangular slit to limit passage of light and increase depth of focus;
    a receiving lens to focus light scattered from the surface onto entrance faces of said detection channels;
    separate detectors, one detector per channel, sensing the light delivered by said fiber optic channels and generating signal pulses at times related to range to the surface; and means for processing said signal pulses in parallel and calculating multiple range values equal to the number of said detection channels.

8. The ranger system of claim 7 wherein the number of said fiber optic channels is about ten to twenty.

9. The ranger system of claim 8 further comprising polygonal mirror means to scan said laser beam in the Y-direction in coordination with the X direction sweep.

10. The ranger system of claim 7 wherein said means for deflecting said laser beam is an acousto-optic deflector.

11. The ranger system of claim 7 wherein said detectors are photomultipliers.

* * * * *